(12) United States Patent
Kim

(10) Patent No.: US 8,227,946 B2
(45) Date of Patent: Jul. 24, 2012

(54) FLAT TYPE VIBRATION MOTOR

(75) Inventor: Yong Tae Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 189 days.

(21) Appl. No.: 12/877,850

(22) Filed: Sep. 8, 2010

(65) Prior Publication Data

US 2011/0298320 A1 Dec. 8, 2011

(30) Foreign Application Priority Data

Jun. 7, 2010 (KR) .................. 10-2010-0053457

(51) Int. Cl.
*H02K 7/06* (2006.01)

(52) U.S. Cl. ............................ 310/81; 310/71

(58) Field of Classification Search .................. 310/71, 310/81

See application file for complete search history.

(56) References Cited

U.S. PATENT DOCUMENTS

| | | | |
|---|---|---|---|
| 6,946,763 B1 * | 9/2005 | Park .................... | 310/81 |
| 7,157,824 B2 * | 1/2007 | Joo et al. .............. | 310/81 |
| 2009/0230797 A1 * | 9/2009 | Park .................... | 310/81 |
| 2010/0253166 A1 * | 10/2010 | Park .................... | 310/81 |

FOREIGN PATENT DOCUMENTS

KR 20-0025296 11/2004

OTHER PUBLICATIONS

Office Action issued on Jul. 14, 2011 for the corresponding Korean Application No. 10-2010-0053457.

* cited by examiner

*Primary Examiner* — Burton Mullins
(74) *Attorney, Agent, or Firm* — Ladas & Parry, LLP

(57) ABSTRACT

There is provided a flat type vibration motor 100 that includes a bracket 150 with a shaft 140 of which one end is inserted into and fixed to the center thereof, a printed circuit board 110 having a terminal portion 130 receiving external electricity and disposed on the side of the bracket 150, a stator disposed on the top of the printed circuit board 110, a rotor 170 rotatably installed in the shaft 140 and generating vibration while rotating by interaction with the stator 160, and a stopper 180 installed at the other end of the shaft 140. The bracket 150 and the shaft 140 are electrically connected with the terminal portion 130. Further, it is possible to use the bracket or a shaft as an external power connection terminal by electrically connecting a negative terminal to the bracket and the shaft through the contact portion.

12 Claims, 4 Drawing Sheets

FLAT TYPE VIBRATION MOTOR

CROSS REFERENCE TO RELATED APPLICATION

This application claims the benefit of Korean Patent Application No. 10-2010-0053457, filed on Jun. 7, 2010, entitled "Flat Type Vibration Motor", which is hereby incorporated by reference in its entirety into this application.

BACKGROUND OF THE INVENTION

1. Technical Field

The present invention relates to a flat type vibration motor.

2. Description of the Related Art

In portable electronic apparatuses such as a cellular phone, a game machine, a portable information terminal, etc., various types of vibration generation devices are mounted on the portable electronic apparatuses in order to prevent disturbing other people due to sound. In particular, the vibration generation device is mounted in the cellular phone sp as to be used as a silent receiving signal generating device and with miniaturization and slimming tendencies of the cellular phones, vibration generating devices mounted therein also require miniaturization and high functionality.

The vibration generating devices use various types of vibration motors as vibration sources. A general vibration motor is separately fixed to a cellular phone set, and the like and connected to a PCB of the cellular phone set through soldering by using a lead wire. However, the vibration motor needs a manual work in a process of fixing the vibration motor to the cellular phone set and a process of soldering the lead wire.

In order to solve the problems, a surface mounted device (SMD) type vibration motor surface-mounted onto and soldered to the PCB of the cellular phone set is being used.

FIG. 1 is a cross-sectional view of an SMD type vibration motor in the prior art and a problem in the prior art will be described with reference to FIG. 1.

As shown in FIG. 1, the SMD type vibration motor 10 in the prior art includes a bracket 12 to which a printed circuit board 11 is fixed, a case 13 partitioning an internal space while covering the top of the bracket 12, a shaft 14 supported by the bracket 12, a magnet which is a stator 15 installed on the top of the bracket 12, and a rotor 16 eccentrically installed in the shaft 14 to be rotatable.

Herein, the rotor 16 includes an upper substrate 16a with a commutator 16b formed on the bottom thereof, a bearing 16c rotatably supported on the shaft 14, a coil 16d and a weight body 16e provided on the top of the upper substrate 16a, and a molding member 16f integrally connecting the upper substrate 16a, the coil 16d, and the weight body 16e to each other.

Further, one portion of a brush 17 is connected to the printed circuit board 11 through welding. The other portion of the brush 17 is connected to the commutator 16b to transmit external power to the coil 16d.

The SMD type vibration motor 10 adopting the structure generates vibration while the rotor 16 rotates by electromagnetic force formed between the coil 16d and the stator 15 when the external power is supplied to the coil 16d by passing through the printed circuit board 11, the brush 17, and the commutator 16b in sequence.

However, in the SMD type vibration motor 10 in the prior art, since the bracket 12 is fixed to the printed circuit board 11 by using a double-sided adhesive tape or a bond, the bracket 12 is not solidly fixed to the printed circuit board 11 and as a result, rotational vibration force of the rotor 16 is decreased or the bracket 12 is separated from the printed circuit board 11 due to the rotation vibration force.

Further, the SMD type vibration motor 10 in the prior art does not include any component that can reduce electromagnetic wave noise generated during the rotation of the motor.

Moreover, since the motor is fixed to the PCB of the cellular phone set by soldering only an external power connection terminal of the printed circuit board 11, fixation force is weak and as a result, when vibration is generated or an impact is received, the motor may be separated from the PCB and the vibration force generated from the rotor 16 cannot be securely transmitted to the cellular phone set.

SUMMARY OF THE INVENTION

The present invention has been made in an effort to provide a flat type vibration motor capable of improving the connection force between a bracket and a printed circuit board by adopting a contact portion connected with a terminal portion and reducing electromagnetic wave noise.

A flat type vibration motor according to a first embodiment of the present invention includes: a bracket with a shaft of which one end is inserted into the center thereof; a printed circuit board having a terminal portion receiving external electricity and disposed on the side of the bracket; a stator disposed on the top of the printed circuit board; a rotor rotatably installed in the shaft to generate vibration while rotating by interaction with the stator; and a stopper installed on the other end of the shaft, wherein the bracket and the shaft are electrically connected with the terminal portion.

Herein, the bracket or the shaft may be used as an external power connection terminal.

Further, the flat type vibration motor may further include a contact portion provided in the printed circuit board so as to connect with the terminal portion and electrically connected with the bracket by contacting with the bracket.

In addition, the contact portion may be connected to a negative terminal of the terminal portion.

The printed circuit board has an opening formed at the center thereof, the contact portion surrounds the opening, the bracket includes a flat portion and a projection portion projected downward from the center of the flat portion to correspond to the opening, and the projection portion is inserted into the opening and the flat portion contacts with the contact portion.

The rotor includes: a bearing rotatably inserted into an outer peripheral surface of the shaft; an upper substrate having a commutator formed on the bottom thereof and having the bearing inserted into the center thereof; and a winding coil and a weight body supported on the bottom of a rotor support fixed to the bearing and disposed on the top of the upper substrate, wherein the flat type vibration motor further includes a brush of which one end is fixed to the terminal portion and the other end contacts with the commutator.

A flat type vibration motor according to a second embodiment of the present invention includes: a bracket with a shaft of which one end is inserted into the center thereof; a printed circuit board having a terminal portion receiving external electricity and disposed on the side of the bracket; a stator disposed on the top of the printed circuit board; a rotor rotatably installed in the shaft to generate vibration while rotating by interaction with the stator; and a case having an inner space covering the rotor, wherein the bracket and the shaft are electrically connected with the terminal portion.

Herein, the bracket or the shaft may be used as an external power connection terminal.

Further, the flat type vibration motor may further include a contact portion provided in the printed circuit board so as to connect with the terminal portion and electrically connected with the bracket by contacting with the bracket.

In addition, the contact portion may be connected to a negative terminal of the terminal portion.

The printed circuit board has an opening formed at the center thereof, the contact portion surrounds the opening, the bracket includes a flat portion and a projection portion projected downward from the center of the flat portion to correspond to the opening, and the projection portion is inserted into the opening and the flat portion contacts with the contact portion.

The rotor includes: a bearing rotatably inserted into an outer peripheral surface of the shaft; an upper substrate having a commutator formed on the bottom thereof; a winding coil and a weight body provided on the top of the upper substrate; and a molding member integrally connecting the upper substrate, the winding coil, and the weight body, wherein the flat type vibration motor further includes a brush of which one end is fixed to the terminal portion and the other end contacts with the commutator.

DESCRIPTION OF THE PREFERRED EMBODIMENTS

Figure 1:
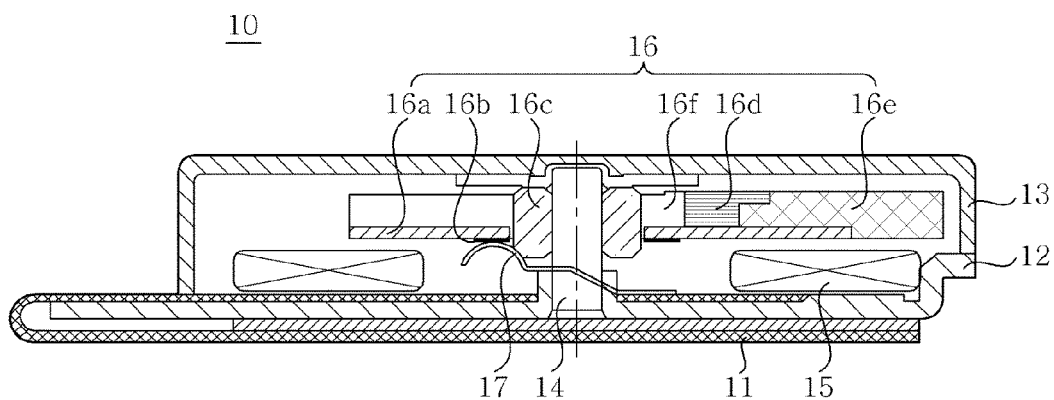
FIG. 1 is a cross-sectional view of a brush type flat type vibration motor in the prior art.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 2:
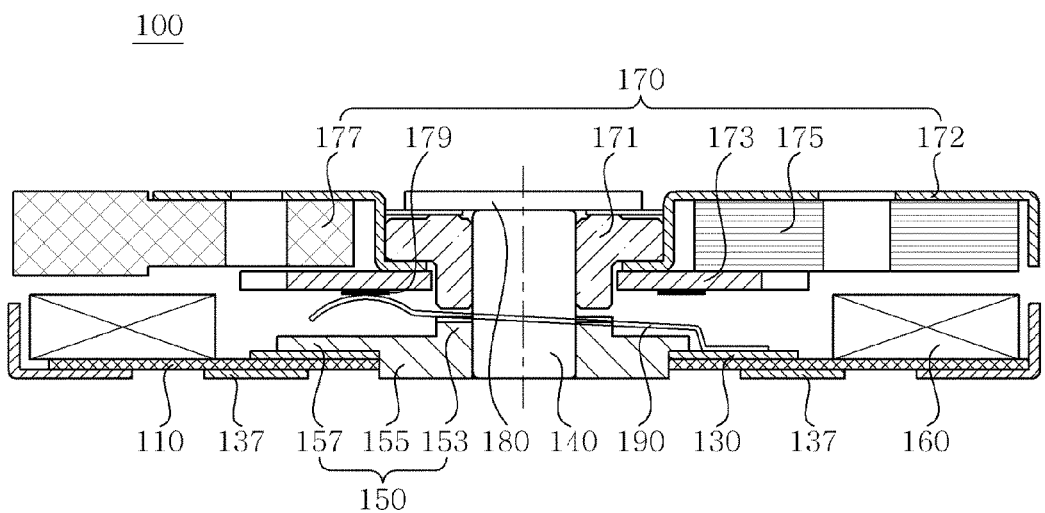
FIG. 2 is a cross-sectional view of a flat type vibration motor according to a first embodiment of the present invention.
Figure 3:
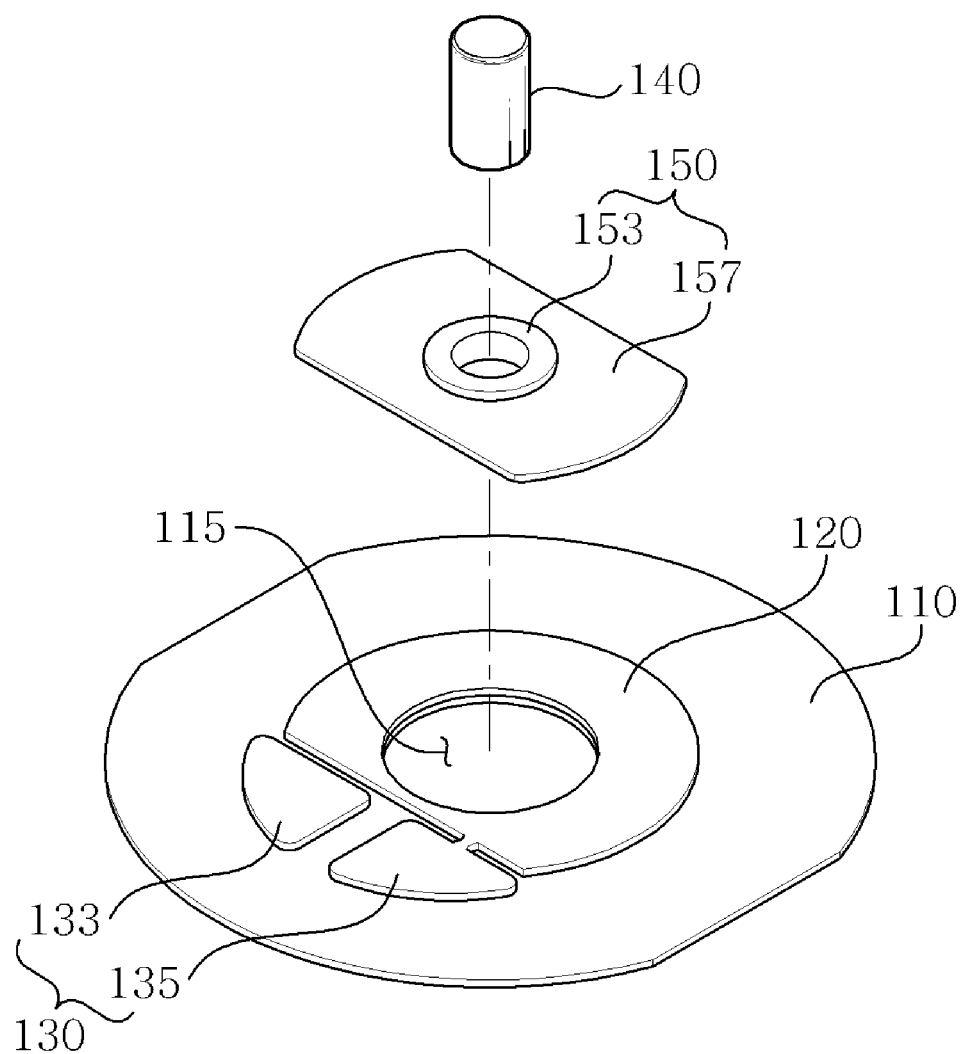
FIG. 3 is an exploded perspective view illustrating the connection relationship among a printed circuit board, a bracket, and a shaft shown in FIG. 2.
Figure 4:
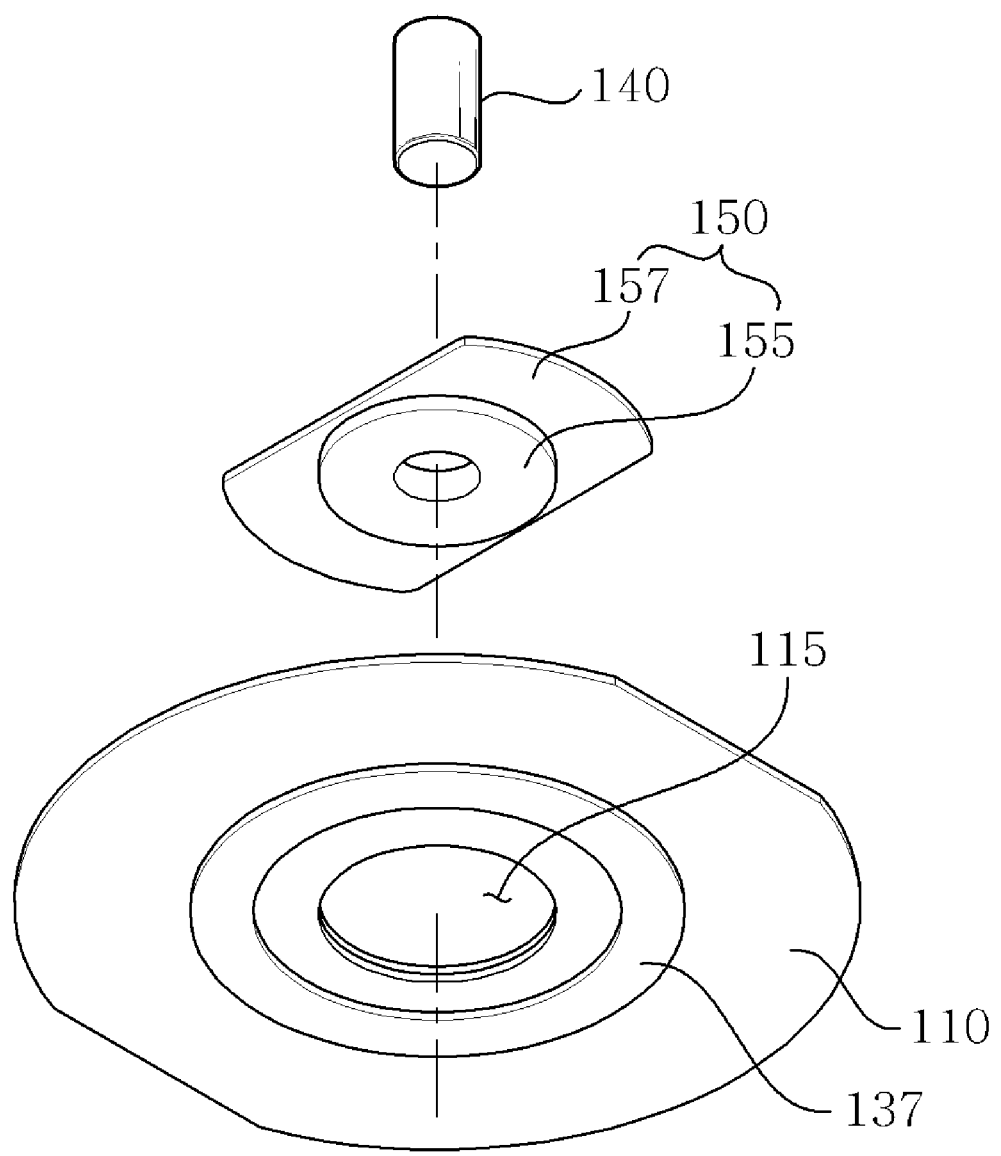
FIG. 4 is an exploded bottom perspective view illustrating the connection relationship among a printed circuit board, a bracket, and a shaft shown in FIG. 2.
Figure 5:
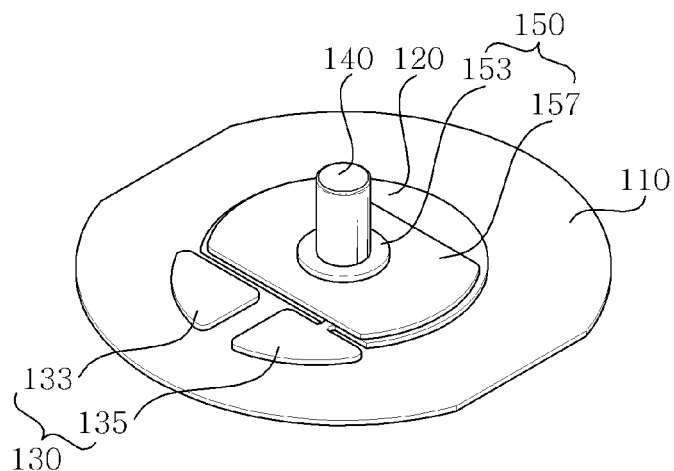
FIG. 5 is a connection perspective view illustrating the connection relationship among a printed circuit board, a bracket, and a shaft shown in FIG. 2.

FIG. 2 is a cross-sectional view of a flat type vibration motor according to a first embodiment of the present invention, FIG. 3 is an exploded perspective view illustrating the connection relationship among a printed circuit board, a bracket, and a shaft shown in FIG. 2, FIG. 4 is an exploded bottom perspective view illustrating the connection relationship among a printed circuit board, a bracket, and a shaft shown in FIG. 2, and FIG. 5 is a connection perspective view illustrating the connection relationship among a printed circuit board, a bracket, and a shaft shown in FIG. 2.

As shown in FIGS. 2 to 5, the flat type vibration motor 100 according to the embodiment of the present invention includes a bracket 150 a shaft 140 of which one end is inserted into and fixed to the center thereof, a printed circuit board 110 having a terminal portion 130 receiving external electricity and disposed on the side of the bracket 150, a stator disposed on the top of the printed circuit board 110, a rotor 170 rotatably installed in the shaft 140 and generating vibration while rotating by interaction with the stator 160, and a stopper 180 installed at the other end of the shaft 140. The bracket 150 and the shaft 140 are electrically connected with the terminal portion 130.

The printed circuit board 110 includes the terminal portion 130 receiving the external electricity to supply power. Further, a contact portion 120 (see FIG. 3) connected with the terminal portion 130 is provided on the top of the printed circuit board 110 and the contact portion 120 contacts with the bracket 150 to electrically connect the terminal portion 130 and the bracket 150 with each other (see FIG. 5). Herein, since the terminal portion 130 is divided into a plus terminal 133 and a negative terminal 135, the contact portion 120 may be connected with any one selected between the plus terminal 133 and the negative terminal 135 as necessary, but the contact portion 120 is preferably connected to the negative terminal 135 in order to maximize an effect to reduce electromagnetic wave noise generated while the rotation of the motor. At this time, the plus terminal 133 is electrically connected with an additional external power connection terminal 137 provided on the bottom of the printed circuit board 110 (see FIGS. 3 to 4).

The bracket 150 supports the shaft 140. A burring portion 153 protruding upwards is formed at the center of the bracket 150 and one end of the shaft 140 is inserted into and fixed to the burring portion 153. Further, the bracket 150 is electrically connected with the terminal portion 130 by contacting the contact portion 120 provided in the printed circuit board 110 so as to reduce electromagnetic wave noise and be used as the external power connection terminal as described above. The contact relationship between the contact portion 120 and the bracket 150 will be described in more detail (see FIGS. 3 to 5). The contact portion 120 surrounds an opening 115 formed at the center of the printed circuit board 110, the bracket 150 includes a flat portion 157 and a projection portion 155 (see FIG. 4) projected downward from the center of the flat portion 157 to correspond to the opening 115, and the projection portion 155 of the bracket 150 is inserted into the opening 115 of the printed circuit board 110 so as to contact the contact portion 120 of the printed circuit board 110 with the flat portion 157 of the bracket 150 (see FIG. 5).

Meanwhile, since the shaft 140 fixed to the burring portion 153 of the bracket 150 is electrically connected with the bracket 150, the terminal portion 130 of the printed circuit board 110 is electrically connected with even the shaft 140 through the bracket 150 so as to more effectively reduce the electromagnetic wave noise and use the shaft 140 as the external power connection terminal.

Unlike the flat type vibration motor in the prior art, the flat type vibration motor 100 according to the embodiment of the present invention electrically connects the bracket 150 and the shaft 140 with the terminal portion 130 of the printed circuit board 110 and uses the bracket 150 as the external power connection terminal by adopting the contact portion 120 of the printed circuit board 110 so as to reduce the electromagnetic wave noise and the bracket 150 is connected to the contact portion 120 of the printed circuit board 110 through welding so as to improve the connection force between the printed circuit board 110 and the bracket 150. Further, since the bracket 150 or the shaft 140 is used as the external power connection terminal, the vibration force generated from the rotor 170 can be securely transmitted to the cellular phone set, and the like and the lifespan of the flat type vibration motor 100 can be extended by connecting the bracket 150 or the shaft 140 in addition to the existing external power connection terminal 137 to the PCB of the cellular phone set, and the like through soldering.

The stator 160 is a magnet and rotates the rotor 170 by interaction with a winding coil 175 by generating a magnetic field having a predetermined intensity and is attached to face the winding coil 175. Herein, the stator 160 is circularly disposed around the shaft 140 vertically fixed to the bracket 150 and is constituted by permanent magnets alternately magnetized to have a plurality of magnetic poles in a circumferential direction. Further, the stator 160 is bonded to the top of the printed circuit board 110 through a bonding material, and the like.

The stopper 180 prevents the rotor 170 from ascending by the rotation of the rotor 170 and is installed on the other end of the shaft 140. Herein, the stopper 180 has a disc shape of which an outer diameter is smaller than an inner diameter of the bearing 171 in order to prevent contacting with a rotor support 172 fixed to an outer peripheral surface of the bearing 171 and is preferably made of a metallic material. Further, the stopper 180 is preferably firmly connected to the other end of the shaft 140 so as to prevent the rotor 170 from ascending and for this, a welding connection, a screw connection, or a cauking connection, and the like may be used.

The rotor 170 eccentrically rotates to generate vibration and includes a bearing 171, an upper substrate 173, a winding coil 175, and a weight body 177.

The bearing 171 is rotatably supported on the shaft 140 and rotatably inserted into the outer peripheral surface of the shaft 140. Herein, a lubricating component may be interposed between the shaft 140 and the bearing 171.

The upper substrate 173 supports the components of the rotor 170 and transmits electric power to the winding coil 175. Herein, the upper substrate 173 has a circular plate shape nrpartially cut to be eccentric and has a through-hole into which the shaft 140 and the bearing 171 are inserted at the center thereof. Further, a commutator 179 partitioned into a plurality of segments is circularly disposed on the bottom of the upper substrate 173 around the through-hole. The commutator 179 transmits the electric power to the winding coil 175 by contacting with a brush 190 to be described below and is formed by a method of pattern printing or plating.

The winding coil 175 serves to generate an electric field having a predetermined intensity when power is applied. The winding coil 175 generates the electric field when power is applied through the commutator 179 which contacts with the brush 190 and generates the electromagnetic force by the interaction between the generated electric field and the magnetic field generated in the stator 160, thereby rotating the rotor 170.

The weight body 177 provides a predetermined mass so as to eccentrically rotate the rotor 170. Herein, the weight body 177 is preferably made of a non-magnetic material having a large specific gravity, for example, tungsten (W) so as to prevent magnetic force from influencing the stator 160.

Meanwhile, the winding coil 175 and the weight body 177 are supported on the bottom of the rotor support 172 and disposed on the top of the upper substrate 173. Herein, the bearing 171 is fixed to the rotor support 172 by press-fit and the bearing 171 may additionally be welded to the rotor support 172. The flat type vibration motor 100 according to the embodiment does not have an additional case and the rotor support 172 also serves as the case so as to save the material cost and a spatial limit by the case is free so as to improve spatial availability and slim the flat type vibration motor 100.

Further, the brush 190 which elastically contacts with the commutator 179 of which one end is fixed to the terminal portion 130 of the printed circuit board 110 and the other end is formed on the bottom of the upper substrate 173 is provided. The brush 190 applies the electric power to the commutator 179. Herein, the brush 190 is constituted by a pair so as to supply current having different polarities to the segments of the commutator 179. Positive (+) current and negative (−) current flow on the pair of brushes 190.

Figure 6:
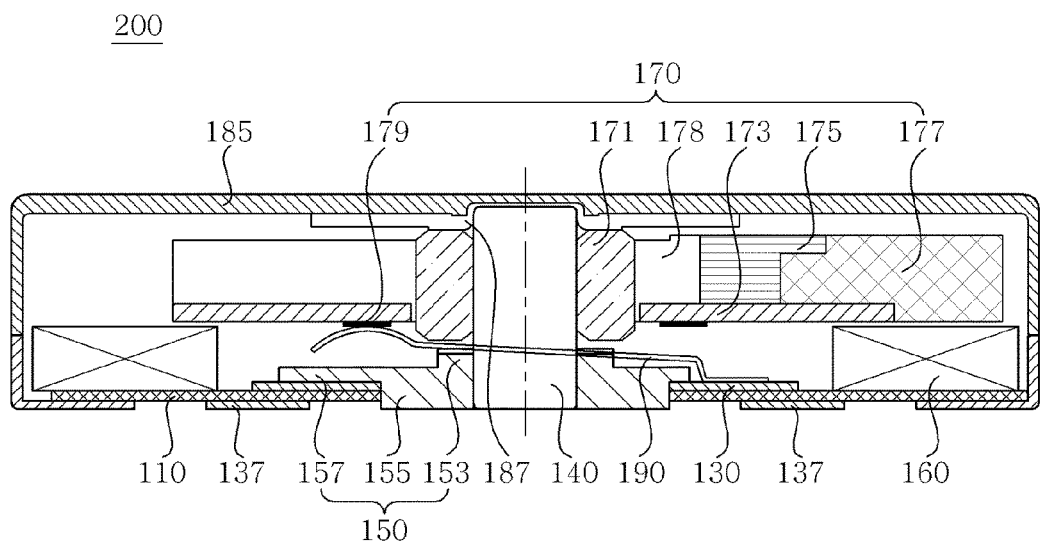
FIG. 6 is a cross-sectional view of a flat type vibration motor according to a second embodiment of the present invention.

FIG. 6 is a cross-sectional view of a flat type vibration motor according to a second embodiment of the present invention.

As shown in FIG. 6, the largest difference between the flat type vibration motor 100 according to the first embodiment and the flat type vibration motor 200 according to the embodiment is whether or not the case 185 is provided. That is, the flat type vibration motor 100 according to the first embodiment does not have the case 185, while the flat type vibration motor 200 according to the embodiment has the case 185. Since other components except whether or not the case 185 is provided are similar to those of the first embodiment, duplicate description will be omitted and a difference will principally be described.

The case 185 is a receiving member providing a rotation space of the rotor 170 by covering the rotor 170 so as to protect the rotor 170, the shaft 140, and the like from the outside. Herein, the case 185 has large permeability so as to form a magnetic path of magnetic flux generated in the winding coils 175 of the stator 160 and the rotor 170 and is made of a material of a magnetic substance having high rigidity so as to prevent the rotor 170 from being restricted due to deformation by external force. At this time, a friction reducing member 187 capable of preventing direct friction with the rotor 170 is preferably provided at the internal center of the case 185.

Further, the rotor 170 includes the upper substrate 173 having the commutator 179 formed on the bottom thereof, the bearing 171 rotatably inserted into one surface of the shaft 140, the winding coil 175 and the weight body 177 provided on the top of the upper substrate 173, and a molding member 178 integrally connecting the upper substrate 173, the winding coil 175, and the weight body 177 to each other.

Further, like the flat type vibration motor 100 according to the first embodiment, the flat type vibration motor 200 according to the embodiment electrically connect the bracket 150 and the shaft 140 with the terminal portion 130 of the printed circuit board 110 by adopting the contact portion 120 of the printed circuit board 110 to use the bracket 150 and the shaft 140 as the external power connection terminal so as to reduce the electromagnetic wave noise and improve the connection force between the printed circuit board 110 and the bracket 150 (see FIGS. 3 to 5).

The flat type vibration motor according to the embodiment of the present invention is not necessarily limited to the brush type and may be applied to a brushless type similarly. In the case of the brushless type, the upper substrate including the brush and the commutator is not provided and a driving IC is fixed to the top of the printed circuit board through soldering. Further, the winding coil is fixed to the printed circuit board of the stator and the magnet is rotatably provided in the rotor. That is, when the brushless type is compared with the brush type, positions of the winding coil and the magnet are exchanged with each other. Except for the above-mentioned difference, even in the brushless type, the bracket and the shaft are electrically connected with the terminal portion of the printed circuit board to use the bracket and the shaft as the external power connection terminal so as to reduce the electromagnetic wave noise and improve the connection force between the printed circuit board and the bracket like the brush type.

According to an embodiment of the present invention, it is possible to prevent a bracket from being separated from a printed circuit board by improving the connection force between the bracket and a printed circuit board by providing a contact portion connected with a terminal portion of the printed circuit board and contacting the bracket to the contact portion.

Further, according to the embodiment of the present invention, it is possible to use the bracket or a shaft as an external power connection terminal by electrically connecting a negative terminal to the bracket and the shaft through the contact portion and reduce electromagnetic wave noise generated while the rotation of the motor.

In addition, according to the embodiment of the present invention, since the bracket or the shaft is used as the external power connection terminal, it is possible to surely transmit vibration force generated from a rotor and extend the life-span of the cellular phone set by connecting the bracket to the PCB of the cellular phone set through soldering.

Although the embodiments of the present invention has been disclosed for illustrative purposes, it will be appreciated that a flat type vibration motor 100 or 200 according to the invention is not limited thereby, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. A flat type vibration motor, comprising:
a bracket with a shaft of which one end is inserted into and fixed to the center thereof;
a printed circuit board having a terminal portion receiving external electricity and disposed on the side of the bracket;
a stator disposed on the top of the printed circuit board;
a rotor rotatably installed in the shaft to generate vibration while rotating by interaction with the stator; and
a stopper installed on the other end of the shaft,
wherein the bracket and the shaft are electrically connected with the terminal portion.

2. The flat type vibration motor as set forth in claim 1, wherein the bracket or the shaft is used as an external power connection terminal.

3. The flat type vibration motor as set forth in claim 1, further comprising a contact portion provided in the printed circuit board so as to connect with the terminal portion and electrically connected with the bracket by contacting with the bracket.

4. The flat type vibration motor as set forth in claim 3, wherein the contact portion is connected to a negative terminal of the terminal portion.

5. The flat type vibration motor as set forth in claim 3, wherein the printed circuit board has an opening formed at the center thereof, the contact portion surrounds the opening, the bracket includes a flat portion and a projection portion projected downward from the center of the flat portion to correspond to the opening, and the projection portion is inserted into the opening and the flat portion contacts with the contact portion.

6. The flat type vibration motor as set forth in claim 1, wherein the rotor includes:
a bearing rotatably inserted into an outer peripheral surface of the shaft;
an upper substrate having a commutator formed on the bottom thereof and having the bearing inserted into the center thereof; and
a winding coil and a weight body supported on a rotor support fixed to the bearing and disposed on the top of the upper substrate, and
the flat type vibration motor further includes a brush of which one end is fixed to the terminal portion and the other end contacts with the commutator.

7. A flat type vibration motor, comprising:
a bracket with a shaft of which one end is inserted into the center thereof;
a printed circuit board having a terminal portion receiving external electricity and disposed on the side of the bracket;
a stator disposed on the top of the printed circuit board;
a rotor rotatably installed in the shaft to generate vibration while rotating by interaction with the stator; and
a case having an inner space covering the rotor,
wherein the bracket and the shaft are electrically connected with the terminal portion.

8. The flat type vibration motor as set forth in claim 7, wherein the bracket or the shaft is used as an external power connection terminal.

9. The flat type vibration motor as set forth in claim 7, further comprising a contact portion provided in the printed circuit board so as to connect with the terminal portion and electrically connected with the bracket by contacting with the bracket.

10. The flat type vibration motor as set forth in claim 9, wherein the contact portion is connected to a negative terminal of the terminal portion.

11. The flat type vibration motor as set forth in claim 9, wherein the printed circuit board has an opening formed at the center thereof, the contact portion surrounds the opening, the bracket includes a flat portion and a projection portion projected downward from the center of the flat portion to correspond to the opening, and the projection portion is inserted into the opening and the flat portion contacts with the contact portion.

12. The flat type vibration motor as set forth in claim 7, wherein the rotor includes:
a bearing rotatably inserted into an outer peripheral surface of the shaft;

an upper substrate having a commutator formed on the bottom thereof;

a winding coil and a weight body provided on the top of the upper substrate; and a molding member integrally connecting the upper substrate, the winding coil, and the weight body, and the flat type vibration motor further includes a brush of which one end is fixed to the terminal portion and the other end contacts with the commutator.

* * * * *